US009942016B2

United States Patent
Liu et al.

(10) Patent No.: US 9,942,016 B2
(45) Date of Patent: Apr. 10, 2018

(54) DEVICE, NETWORK, AND METHOD FOR NETWORK ADAPTATION AND DISCOVERY

(71) Applicant: Futurewei Technologies, Inc., Plano, TX (US)

(72) Inventors: Jialing Liu, Palatine, IL (US); Weimin Xiao, Hoffman Estates, IL (US); Qian Cheng, Aurora, IL (US)

(73) Assignee: Futurewei Technologies, Inc., Plano, TX (US)

( * ) Notice: Subject to any disclaimer, the term of this patent is extended or adjusted under 35 U.S.C. 154(b) by 131 days.

(21) Appl. No.: 14/665,933

(22) Filed: Mar. 23, 2015

(65) Prior Publication Data

US 2015/0271744 A1    Sep. 24, 2015

Related U.S. Application Data

(60) Provisional application No. 61/968,911, filed on Mar. 21, 2014, provisional application No. 61/971,216, filed on Mar. 27, 2014.

(51) Int. Cl.
*H04L 5/00* (2006.01)
*H04W 24/02* (2009.01)
*H04W 48/16* (2009.01)
*H04W 24/10* (2009.01)

(52) U.S. Cl.
CPC .......... *H04L 5/005* (2013.01); *H04W 24/02* (2013.01); *H04W 24/10* (2013.01); *H04W 48/16* (2013.01)

(58) Field of Classification Search
CPC ..... H04W 48/16; H04W 24/10; H04W 24/02; H04L 5/005
See application file for complete search history.

(56) References Cited

U.S. PATENT DOCUMENTS 9,426,801 B2    8/2016    Yang et al.
2010/0165882 A1    7/2010    Palanki et al.
2011/0134774 A1    6/2011    Pelletier et al.
(Continued)

FOREIGN PATENT DOCUMENTS

EP    2744282 A1    6/2017
JP    2013042264 A    2/2013
(Continued)

OTHER PUBLICATIONS

"On Procedure Enhancements for Small Cell Fast on/off Operation," Source: MediaTek Inc., Agenda Item: 7/2/4/2/1, Document for: Discussion and Decision, 3GPP TSG-RAN WG1 #76, R1-140244, Prague, Czech Republic, Feb. 10-14, 2014, 6 pages.
"CSI-RS Based RRM Measurement for Synchronised New Carriers," Source: New Postcom, Document for: Discussion and Decision, Agenda Item: 6.3.1.2, 3GPP TSG RAN WG1 Meeting #71, R1-124949, New Orleans, Nov. 12-16, 2012, 4 pages.
(Continued)

*Primary Examiner* — Michael Thier
*Assistant Examiner* — Brian Cox
(74) *Attorney, Agent, or Firm* — Slater Matsil, LLP

(57) ABSTRACT

System and method embodiments are provided for network adaptation and discovery. A method in a network controller includes transmitting a measurement reporting signaling to a user equipment (UE), the measurement reporting signaling indicating a radio resource management (RRM) measurement reporting configuration comprising a discovery reference signal (DRS) configuration of the UE; and controlling a network component to transmit only the DRS signal in response to the network component being deactivate.

26 Claims, 7 Drawing Sheets

(56) References Cited

U.S. PATENT DOCUMENTS

| | | |
|---|---|---|
| 2012/0213109 A1 | 8/2012 | Xu et al. |
| 2013/0012188 A1 | 1/2013 | Gao et al. |
| 2013/0114398 A1 | 5/2013 | Wang |
| 2013/0322276 A1 | 12/2013 | Pelletier et al. |
| 2014/0056376 A1 | 2/2014 | Guo et al. |
| 2015/0049753 A1* | 2/2015 | Park .................. H04W 56/0045 370/350 |
| 2015/0358094 A1* | 12/2015 | Yi ........................ H04B 17/318 370/252 |

FOREIGN PATENT DOCUMENTS

| | | |
|---|---|---|
| JP | 2013102432 A | 5/2013 |
| WO | 2013168938 A1 | 11/2013 |
| WO | 2014007593 A1 | 1/2014 |

OTHER PUBLICATIONS

"Intra-LTE Energy Saving Solution: Cell Switch Off in a Collaborative Network," Agenda Item: 22.2, Source: Alcatel-Lucent, Document for: Discussion and Approval, 3GPP TSG RAN WG3 Meeting #67, R3-100875, San Francisco, Feb. 22-26, 2010, 4 pages.
3GPP TR 36.872 V12.1.0 (Dec. 2013); 3rd Generation Partnership Project; Technical Specification Group Radio Access Network; Small cell enhancements for E-UTRA and E-UTRAN—Physical layer aspects (Release 12); 100 pages.
3GPP TSG RAN WG1 Meeting #74bis, R1-134064, Guangzhou, China, Oct. 7-11, 2013, Huawei, HiSilicon, "Details and Enhancements for Semi-Static Small Cell on/off Schemes", 6 pages.
3GPP TSG RAN WG1 Meeting #76, R-140758, Prague, Czech Republic, Feb. 10-14, 2014, Ericsson, "On Small Cell on/off and the New L1 procedure", Discussion, 6 pages.

* cited by examiner

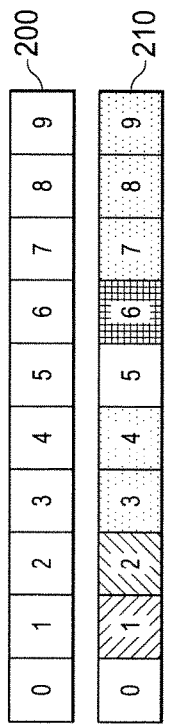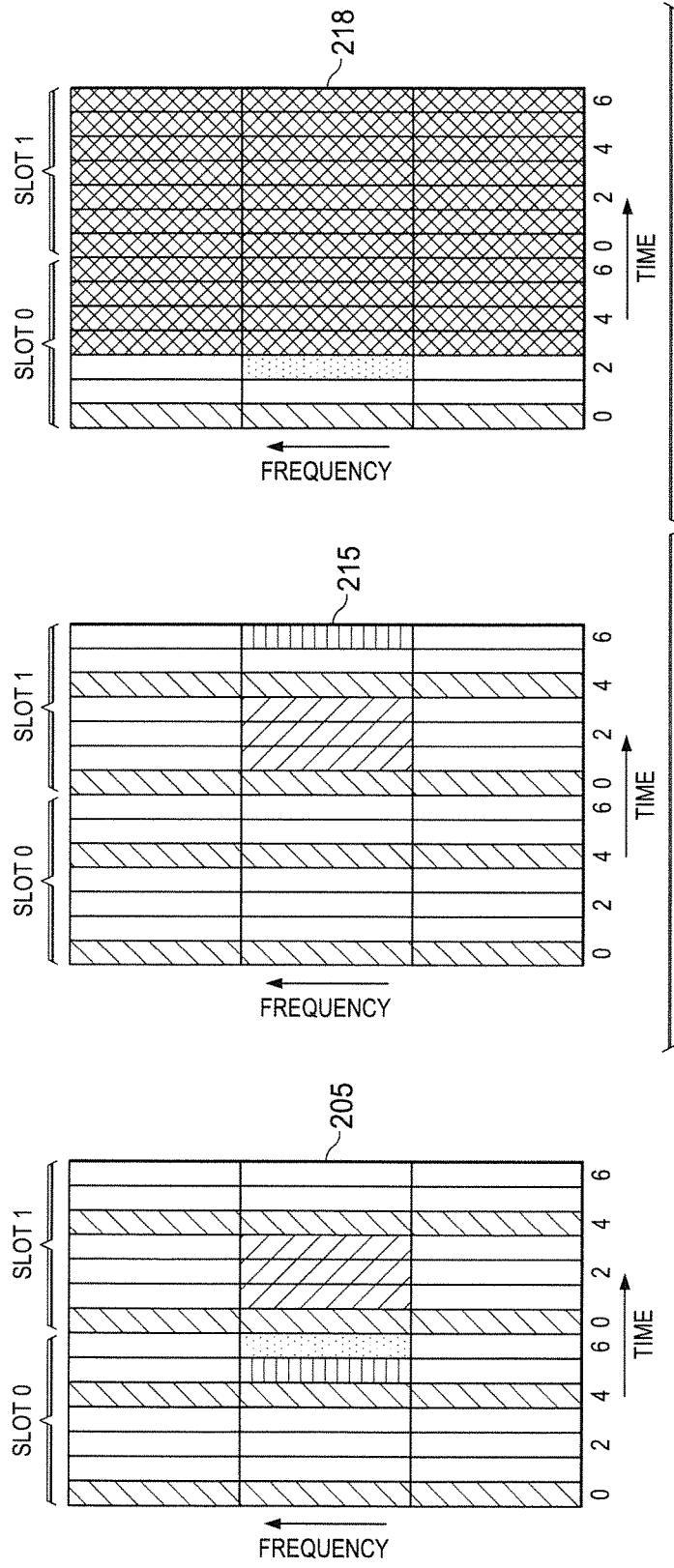
FIG. 2B
FIG. 2C
FIG. 2D

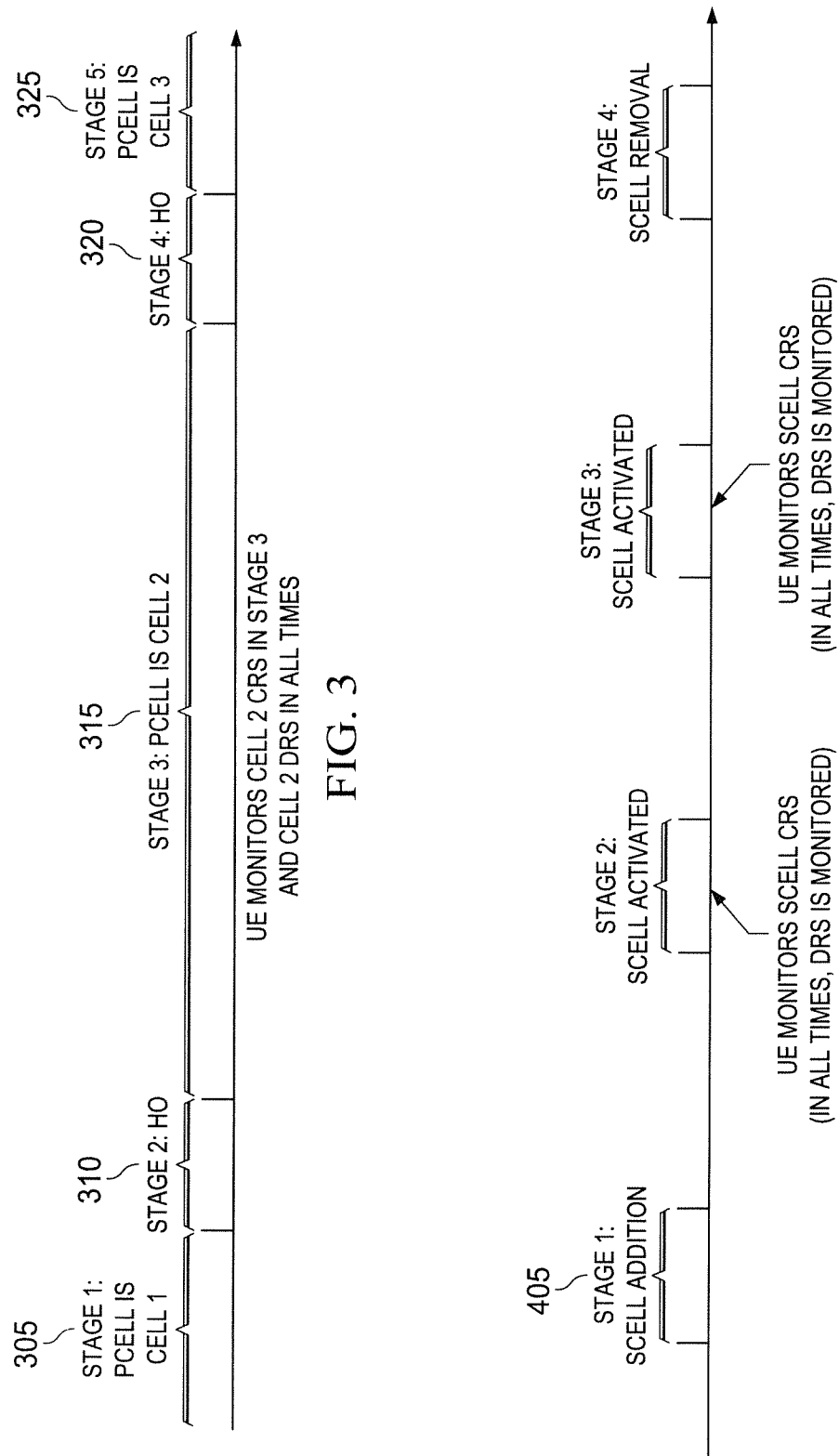

US 9,942,016 B2

DEVICE, NETWORK, AND METHOD FOR NETWORK ADAPTATION AND DISCOVERY

CROSS-REFERENCE TO RELATED APPLICATIONS

The present application claims priority to U.S. provisional Application No. 61/968,911, filed on Mar. 21, 2014, and to U.S. Provisional Application No. 61/971,216, filed on Mar. 27, 2014, each of which is incorporated herein by reference.

TECHNICAL FIELD

The present disclosure relates to a device, network, and method for wireless communications, and, in particular embodiments, to a device and method for network adaptation and discovery.

BACKGROUND

The amount of wireless data being transferred is expected to exceed that of wired data, pushing the limits of macro cellular deployment. Small cell deployment may be used to help handle this increase in data capacity, while meeting customer quality of service expectations and operators' requirements for cost-effective service delivery.

Small cells generally are low-power wireless access points that provide improved cellular coverage and capacity. Different types of small cells include, generally from smallest size to largest size, femtocells, picocells, and microcells.

SUMMARY

The present disclosure relates to a device, network, and method for wireless communications, and, in particular embodiments, to a device and method for network adaptation and discovery.

According to one embodiment, a method in a network controller for communicating with user equipment (UE) and controlling a network component comprises transmitting, by the network controller, a measurement reporting signaling to the UE, the measurement reporting signaling indicating a radio resource management (RRM) measurement reporting configuration comprising a discovery reference signal (DRS) configuration of the UE; and controlling the network component to transmit only the DRS signal in response to the network component being deactivated.

In another embodiment, there is provided a network controller in a wireless network for communicating with user equipment (UE) and controlling a network component. The network controller comprises a transmitter configured to transmit a measurement reporting signaling to the UE, the measurement reporting signaling indicating a radio resource management (RRM) measurement reporting configuration comprising a discovery reference signal (DRS) configuration of the UE; and a processor and memory coupled to the transmitter, wherein the processor and memory are configured to control the network component to transmit only the DRS signal in response to the network component being deactivated.

In yet another embodiment, there is provided a method in a user equipment (UE) for communicating in a wireless network, the method comprising receiving, at the UE, a measurement reporting signaling from a network controller, the measurement reporting signaling indicating a radio resource management (RRM) measurement reporting configuration comprising a discovery reference signal (DRS) configuration of the UE; and receiving, at the UE, only the DRS signal in response to a network component being deactivated.

In still another embodiment, there is provided a user equipment (UE) for communicating in a wireless network, comprising a receiver configured to receive a measurement reporting signaling from a network controller, the measurement reporting signaling indicating a radio resource management (RRM) measurement reporting configuration comprising a discovery reference signal (DRS) configuration of the UE; and receive only the DRS signal in response to a network component being deactivated.

BRIEF DESCRIPTION OF THE DRAWINGS

For a more complete understanding of the present disclosure, and the advantages thereof, reference is now made to the following descriptions taken in conjunction with the accompanying drawing, in which:

FIG. 2B illustrates an example embodiment of frame structure for a frequency division duplexing (FDD) configuration and a time division duplexing (TDD) configuration;

FIG. 2C illustrates an example embodiment of OFDM subframe for FDD configuration;

FIG. 2D illustrates an example embodiment of OFDM subframe for TDD configuration;

FIG. 3 illustrates an example embodiment of UE monitoring behavior involving handoff;

FIG. 4 illustrates an example embodiment of UE monitoring behavior involving an Scell;

DETAILED DESCRIPTION

Typically, in a modern wireless communications system, such as a Third Generation Partnership Project (3GPP) Long Term Evolution (LTE) compliant communications system, a plurality of cells or evolved NodeBs (eNB) (also commonly referred to as NodeBs, base stations (BSs), base terminal stations, communications controllers, network controllers, controllers, access points (APs), and so on) may be arranged into a cluster of cells, with each cell having multiple transmit antennas. Additionally, each cell or eNB may be serving a number of users (also commonly referred to as User Equipment (UE), wireless device, mobile stations, users, subscribers, terminals, and so forth) based on a priority metric, such as fairness, proportional fairness, round robin, and the like, over a period of time. It is noted that the terms cell, transmission points, and eNB may be used interchangeably. Distinction between cells, transmission points, and eNBs will be made where needed.

Figure 1A:
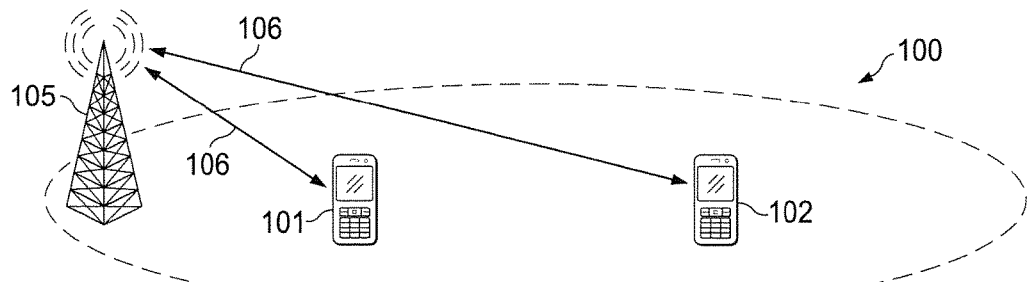
FIG. 1A illustrates an example embodiment of cellular communications in a macro cell.

FIG. 1A shows a system 100 illustrating a typical wireless network with a communications controller 105 communicating using a wireless link 106 to a first wireless device 101 and a second wireless device 102. The wireless link 106 can comprise a single carrier frequency such as used typically for a time division duplex (TDD) configuration or a pair of carrier frequencies as used in a frequency division duplex (FDD) configuration. Not shown in the system 100 are some of the network elements used to support the communications controller 105 such as a backhaul, management entities, etc. The transmission from a controller to a UE is called downlink (DL) transmission, and the transmission from a UE to a controller is called uplink (UL) transmission.

Figure 1B:
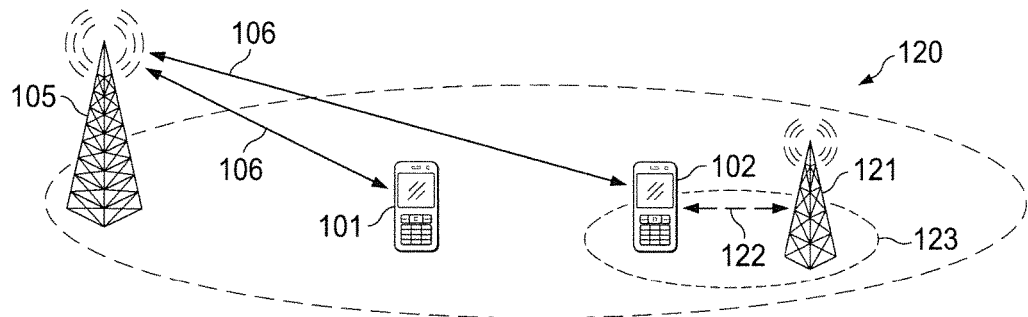
FIG. 1B illustrates an example embodiment of cellular communications in a heterogeneous network with a macro cell and a pico cell.

FIG. 1B shows an embodiment of a system 120 illustrating an example wireless heterogeneous network (HetNet) with the communications controller 105 communicating to the wireless device 101 using wireless link 106 (solid line) and to the wireless device 102 using the wireless link 106. A second communications controller 121, such as a pico cell, has a coverage area 123 and is capable of communicating to the wireless device 102 using a second wireless link 122. Typically, the wireless link 122 and the wireless link 106 use the same carrier frequency, but the wireless link 122 and the wireless link 106 can use different frequencies. There may be a backhaul (not shown) connecting the communications controller 105 and the communications controller 121. A HetNet may include a macro cell and a pico cell, or generally a higher power node/antenna with a larger coverage and lower power node/antennas with a smaller coverage. Lower power nodes (or lower power points, picos, femtos, micros, relay nodes, remote radio heads (RRHs), remote radio units, distributed antennas, etc.) generally are low-power wireless access points that operate in a licensed spectrum. Small cells may use lower power nodes. Lower power nodes provide improved cellular coverage, capacity and applications for homes and businesses, as well as metropolitan and rural public spaces.

In an embodiment network such as the system 120 in FIG. 1B, there may be multiple macro points 105 and multiple pico points 121 operating with multiple component carriers, and the backhaul between any two points can be fast backhaul or slow backhaul depending on the deployment. When two points have fast backhaul, the fast backhaul may be fully utilized, e.g., to simplify the communication method and system or to improve coordination. In this network, the points configured for a UE for transmission or reception may include multiple points, some pairs of points may have fast backhaul, but some other pairs of points may have slow backhaul or so called "any backhaul" (generally types of backhaul connections without necessarily being fast).

In an exemplary deployment, an eNodeB may control one or more cells. Multiple remote radio units may be connected to the same base band unit of the eNodeB by fiber cable, and the latency between base band unit and remote radio unit is quite small. Therefore the same base band unit can process the coordinated transmission/reception of multiple cells. For example, the eNodeB may coordinate the transmissions of multiple cells to a UE, which is called coordinated multiple point (CoMP) transmission. The eNodeB may also coordinate the reception of multiple cells from a UE, which is called CoMP reception. In this case, the backhaul link between these cells with the same eNodeB is fast backhaul and the scheduling of data transmitted in different cells for the UE can be easily coordinated in the same eNodeB.

As an extension of the HetNet deployment, possibly densely deployed small cells using low power nodes are considered promising to cope with mobile traffic explosion, especially for hotspot deployments in indoor and outdoor scenarios. A low-power node generally means a node whose transmission power is lower than macro node and BS classes, for example Pico and Femto eNB are both applicable. Small cell enhancements for E-UTRA and E-UTRAN, which is an ongoing study in 3GPP, will focus on additional functionalities for enhanced performance in hotspot areas for indoor and outdoor using possibly densely deployed low power nodes.

Figure 1C:
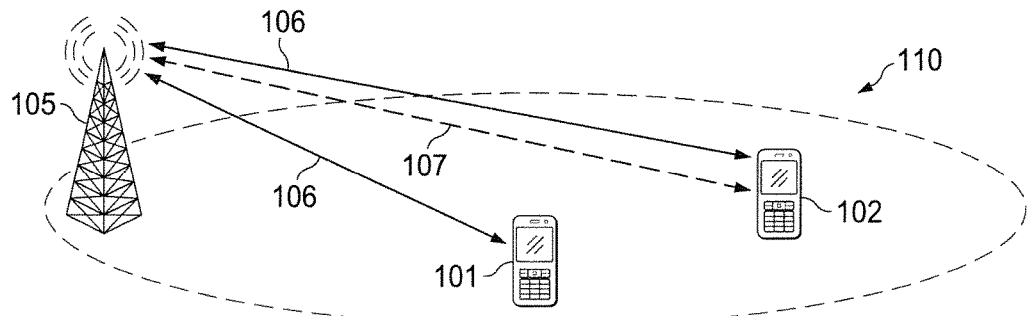
FIG. 1C illustrates an example embodiment of cellular communications in a macro cell with carrier aggregation.

FIG. 1C shows a system 110 illustrating a typical wireless network configured with carrier aggregation (CA) where the communications controller 105 communicates to the wireless device 101 using the wireless link 106 (solid line) and to the wireless device 102 using the wireless link 107 (dashed line) and the wireless link 106. In some example deployments, for the wireless device 102, the wireless link 106 can be called a primary component carrier (PCC) while the wireless link 107 can be called a secondary component carrier (SCC). In some carrier aggregation deployments, the PCC can be provided feedback from a wireless device to a communications controller while the SCC can carry data traffic. In the 3GPP Rel-10 specification, a component carrier is called a cell. When multiple cells are controlled by a same eNodeB, cross scheduling of multiple cells is possible to be implemented because there may be a single scheduler in the same eNodeB to schedule the multiple cells. With CA, one eNB may operate and control several component carriers forming primary cell (Pcell) and secondary cell (Scell). In Rel-11 design, an eNodeB may control both a Macro cell and a Pico cell. In this case, the backhaul between the Macro cell and the Pico cell is fast backhaul. The eNodeB can control the transmission/reception of both macro cell and Pico cell dynamically.

Figure 1D:
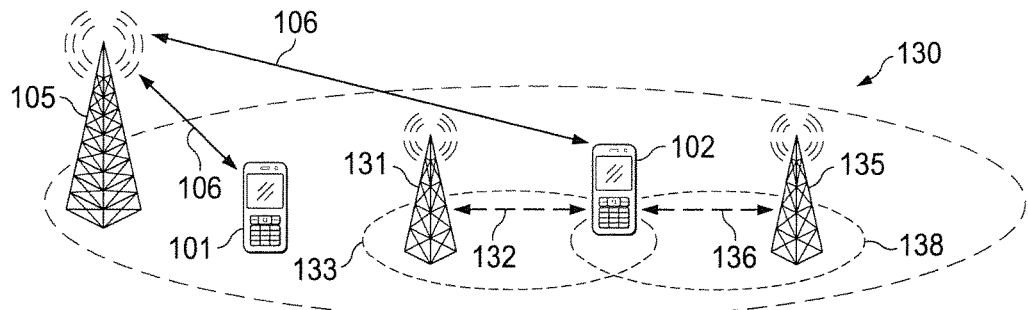
FIG. 1D illustrates an example embodiment of cellular communications in a heterogeneous network with a macro cell and several small cells.

FIG. 1D shows a system 130 illustrating an example wireless heterogeneous network with the communications controller 105 communicating to the wireless device 101 using the wireless link 106 (solid line) and to the wireless device 102 using the wireless link 106. A second communications controller 131, such as a small cell, has a coverage area 133 and is capable of communicating to the wireless device 102 using the wireless link 132. A communications controller for another small cell 135 has a coverage area 138 and uses the wireless link 136. The communications controller 135 is capable of communicating to the wireless device 102 using the wireless link 136. The coverage areas 133 and 138 may overlap. The carrier frequencies for the wireless links 106, 132, and 136 may be the same or may be different.

Figure 1E:
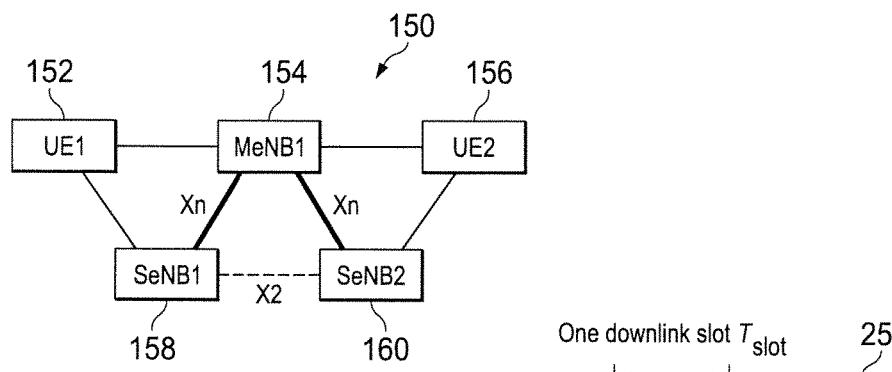
FIG. 1E illustrates an example embodiment of a dual connectivity scenario.

FIG. 1E illustrates an example embodiment system 150 configured for dual connectivity. A master eNB (MeNB) 154 is connected to a plurality of secondary eNBs (SeNBs) 158-160 using an interface such as the Xn interface (Xn can be X2 in some specific cases). The backhaul can support this interface. Between the SeNBs 158-160, there may be an X2 interface. A UE, such as UE1 152, is connected wirelessly to MeNB1 154 and SeNB1 158. A second UE, UE2 156, can connect wirelessly to MeNB1 154 and SeNB2 160.

In orthogonal frequency-division multiplexing (OFDM) systems, the frequency bandwidth is divided into multiple subcarriers in frequency domain. In the time domain, one subframe is divided into multiple OFDM symbols. Each OFDM symbol may have cyclic prefix to avoid the inter-symbol interference due to multiple path delays. One resource element (RE) is defined by the time-frequency resource within one subcarrier and one OFDM symbol. A reference signal and other signals, such as data channel, e.g., physical downlink shared channel (PDSCH), and control channel, e.g., physical downlink control channel (PDCCH), are orthogonal and multiplexed in different resource elements in time-frequency domain. Further, the signals are modulated and mapped into resource elements. For each OFDM symbol, the signals in the frequency domain are transformed into the signals in time domain using, e.g., Fourier transforms, and are transmitted with added cyclic prefix to avoid the inter-symbol interference.

Figure 2A:
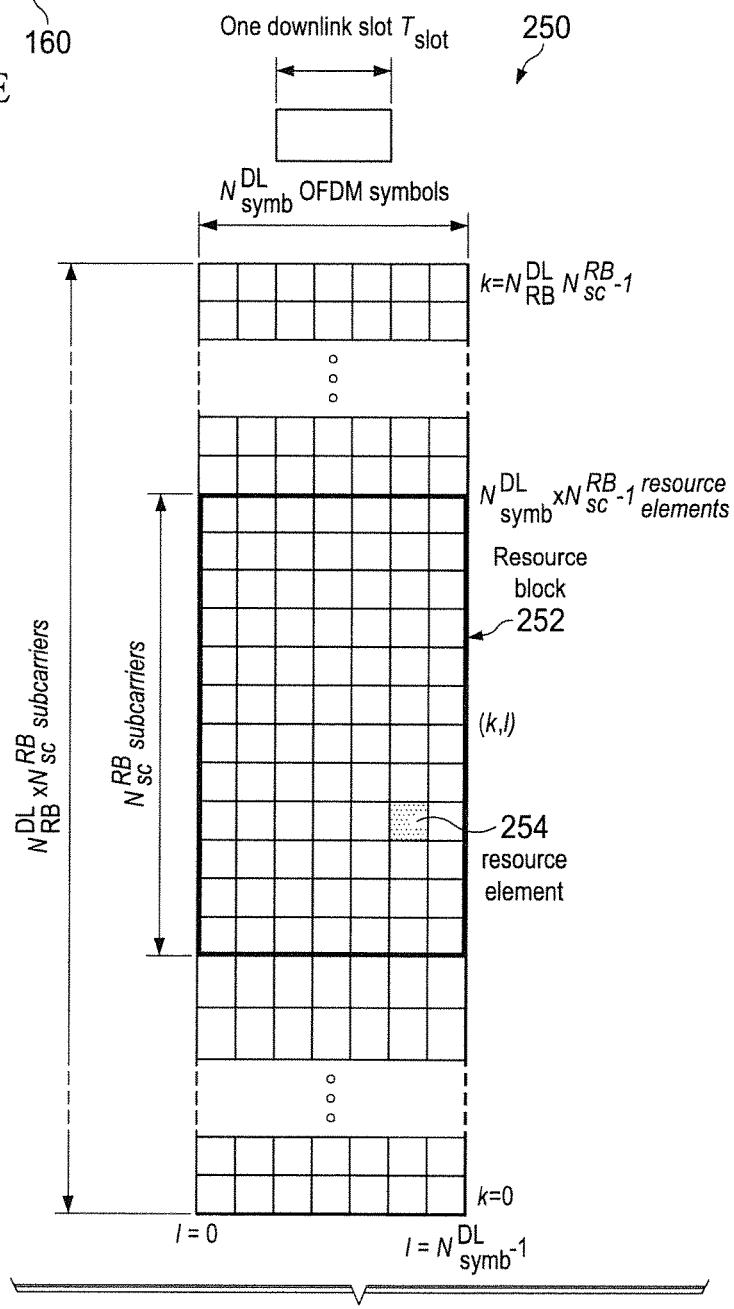
FIG. 2A illustrates an example embodiment of orthogonal frequency division multiplexing (OFDM) symbols with normal cyclic prefix (CP)

Each resource block (RB) contains a number of REs. FIG. 2A illustrates example OFDM symbols 250 with normal cyclic prefix (CP). There are 14 OFDM symbols labeled from 0 to 13 in each subframe. The symbols 0 to 6 in each subframe correspond to even numbered slots, and the symbols 7 to 13 in each subframe correspond to odd numbered slots. In the figure, only one slot of a subframe is shown. There are 12 subcarriers labeled from 0 to 11 in each RB 252, and hence in this example, there are 12×14=168 REs 254 in an RB 252 pair (an RB 252 is 12 subcarriers by the number of symbols in a slot). In each subframe, there are a number of RBs 252, and the number may depend on the bandwidth (BW).

FIG. 2B illustrates two frame configurations used in LTE. Frame 200 is typically used for an FDD configuration, where all 10 subframes, labeled 0 through 9, communicate in the same direction (downlink in this example). Each subframe is 1 millisecond in duration and each frame is 10 milliseconds in duration. Frame 210 shows a TDD configuration where certain subframes are allocated for downlink transmissions (such as unshaded boxes (subframes 0 and 5), for uplink transmissions (vertical lines (subframe 2)), and special (dotted box (subframe 1)) which contain both uplink and downlink transmissions. An entire subframe dedicated for downlink (uplink) transmission can be called a downlink (uplink) subframe. Subframe 6 can be either a downlink or a special subframe depending on TDD configuration. Each of the solid shaded boxes (subframes 3, 4, 7, 8, and 9) can be either a downlink subframe or an uplink subframe depending on TDD configuration. The coloring used in frame 210 is exemplary but is based on the standards TSG 36.211 Rel. 11.

FIG. 2C and FIG. 2D illustrate example embodiments of downlink subframes that are partitioned in terms of symbols and frequency. The subframe, such as subframe 205, is divided into 3 sections in the frequency domain (assuming the number of RBs is greater than 6). An analogous diagram can be shown for a 6 RBs downlink bandwidth (e.g., bandwidth of the downlink carrier).

In FIG. 2C, subframe 205 shows an example of the symbol allocation for an FDD configuration for subframes 0 and 5. The solid shading shows the symbols that have the common reference signal (CRS). The example assumes either CRS is transmitted on antenna port 0 or on antenna ports 0 and 1. The horizontal shading shows the location of the secondary synchronization signal (SSS). The dotted shading shows the location of the primary synchronization signal (PSS). Both the PSS and SSS occupy the center six resource blocks of the downlink carrier. The diagonal lines in symbols 0, 1, 2, 3 of slot 1 represent the location where the physical broadcast channel (PBCH) occupies for subframe 0. The PBCH is not transmitted in subframe 5 in Rel. 11 of the standards. Note, the PSS, SSS, and CRS can be viewed as overhead.

In FIG. 2D, a subframe 215 shows an example of the symbol allocation for subframes 0 and 5 of TDD subframe 210 in FIG. 2B. Likewise, a subframe 218 shows an example of the symbol allocation for subframes 1 and 6 of TDD subframe 210. In both the subframe 215 and the subframe 218, the solid shading shows the symbols having the CRS. The example also assumes either CRS is transmitted on antenna port 0 or on antenna ports 0 and 1. The horizontal shading in the subframe 215 shows the location of the SSS. The dotted shading in the subframe 218 shows the location of the PSS. Both the PSS and SSS occupy the center six RBs of the downlink carrier. The cross shading in the subframe 218 indicates that the remaining symbols of the subframe are either downlink (if subframe 6 is a downlink subframe) or a combination of downlink symbols, guard time, and uplink symbols if the subframe is a special subframe. Similar to FIG. 2C, the diagonal lines in symbols 0, 1, 2, 3 of slot 1 represent the location where the PBCH occupies for subframe 0. The PBCH is not transmitted in subframe 5 in Rel. 11 of the standards. Note, the PSS, SSS, and CRS can be viewed as overhead. The information contents of the PBCH (i.e., master information block) can change every 40 ms.

Figure 2E:
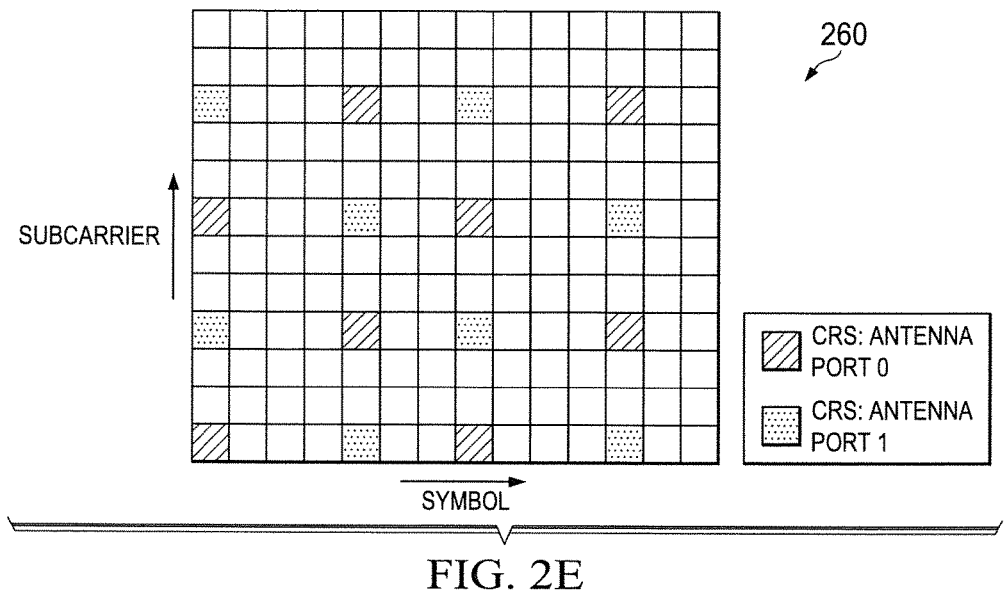
FIG. 2E illustrates an example embodiment of common reference signal (CRS)

In downlink transmission of LTE-A system, there is a reference signal 260 for UE to perform channel estimation for demodulation of PDCCH and other common channels as well as for measurement and some feedbacks, which is CRS inherited from the Rel-8/9 specification of E-UTRA, as shown in FIG. 2E. Dedicated/de-modulation reference signal (DMRS) can be transmitted together with the PDSCH channel in Rel-10 of E-UTRA. DMRS is used for channel estimation during PDSCH demodulation. DMRS can also be transmitted together with the enhanced PDCCH (EPDCCH) for the channel estimation of EPDCCH by the UE. The notation (E)PDCCH indicates EPDCCH and/or PDCCH.

Figure 2F:
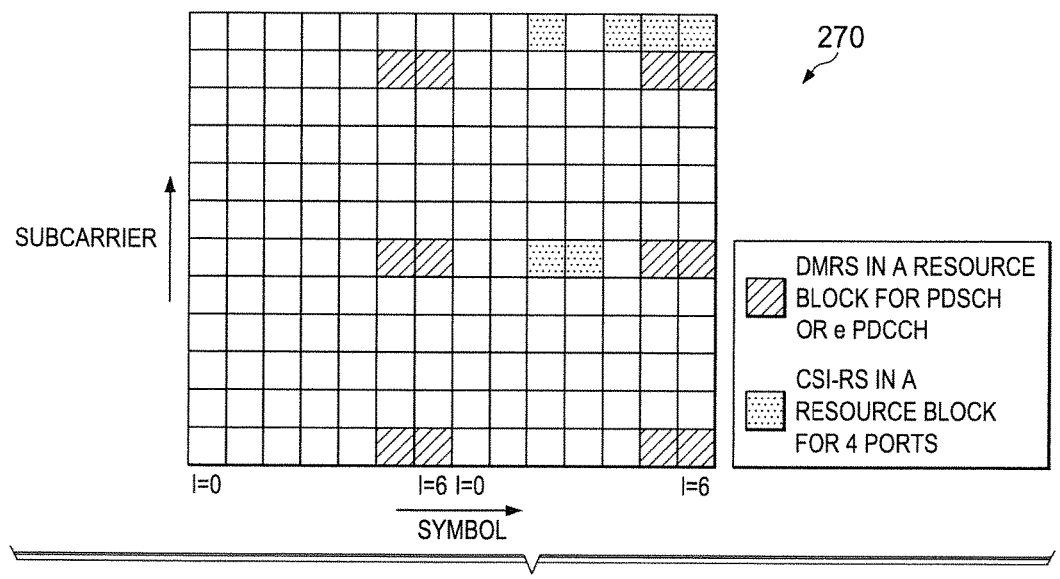
FIG. 2F illustrates an example embodiment of channel status indicator reference signal (CSI-RS) and dedicated/demodulation reference signal (DMRS)

In Rel-10, channel status indicator reference signal (CSI-RS) 270 is introduced in addition to CRS and DMRS, as shown in FIG. 2F. CSI-RS is used for Rel-10 UEs to measure the channel status, especially for multiple antennas cases. PMI/CQI/RI and other feedback may be based on the measurement of CSI-RS for Rel-10 and beyond UE. PMI is the precoding matrix indicator, CQI is the channel quality indicator, and RI is the rank indicator of the precoding matrix. There may be multiple CSI-RS resources configured for a UE. There is specific time-frequency resource and scrambling code assigned by the eNB for each CSI-RS resource.

Figure 2G:
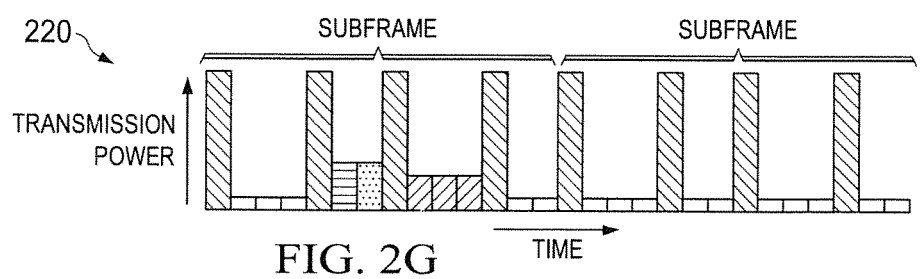
FIG. 2G illustrates an example embodiment of transmission power.

FIG. 2G shows an exemplary plot 220 of the transmission power from a communications controller, such as 105 in FIG. 1A, for a FDD configuration for subframes 0 and 1. Plot 220 shows the communication controller still transmits signals such as the CRS (solid shading), the SSS (horizontal shading), the PSS (dotted shading), and the PBCH (diagonal shading) even if there is no other data to transmit on the downlink. The transmission of these signals can increase the interference observed in a system such as in FIG. 1B even when communications controller 121 is not serving a UE such as wireless device 102. This interference can reduce the system capacity.

Figure 6:
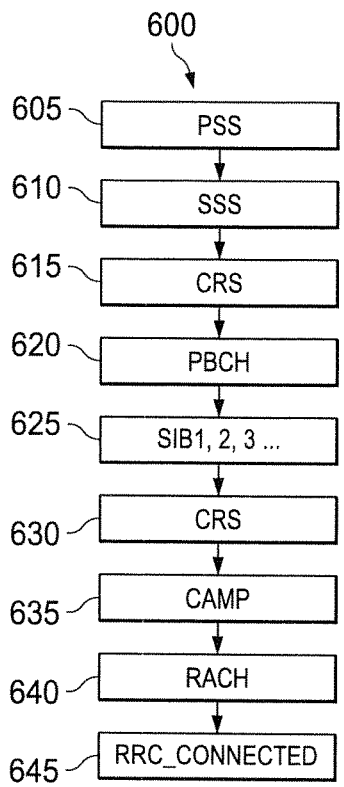
FIG. 6 illustrates a flowchart of one example of how a wireless device uses the signals presented.

However, eliminating these signals entirely can impair system operation. For example, a wireless device relies on these signals to synchronize (both time and frequency) and the make measurements. One example how a wireless device uses these signals is presented using some of the steps of flowchart 600 in FIG. 6. The wireless device first detects the transmitted PSS in step 605. The wireless device can then detect the SSS in step 610. Having both the PSS and SSS provides the wireless device information such as: 1) frame configuration (FDD or TDD); 2) cyclic prefix used for certain downlink subframes; 3) the cell id; 4) the location of subframe 0. In addition, the wireless device can perform coarse frequency and timing synchronization using the PSS and SSS. Because the wireless device knows the cell id, cyclic prefix, and location of subframe 0, the wireless device can make measurements on the CRS in subframes 0 and 5 as shown in step 615. Example measurements are the reference signal received power (RSRP), the received signal strength indicator (RSSI), and the reference signal received quality (RSRQ). The CRS can be used to improve frequency and timing synchronization. If the measurements indicate that the communications controller is satisfactory (in terms of received signal quality), the wireless device may choose to process the PBCH to determine other information such as the number of antenna ports over which the CRS is transmitted, the frame numbering (e.g., 0 to 1023), and the downlink bandwidth (bandwidth of the downlink carrier) as shown in step 620. The remaining steps in FIG. 6 show how the UE can become assigned to an eNB. In step 625, the UE listens to system information broadcast (SIB) messages, such as SIB1, SIB2, etc. To listen to SIB messages, the UE typically receives the PDCCH to process the downlink control information (DCI) to obtain the modulation, coding, etc. information for the PDSCH carrying the SIB message. In step 630, the UE may process more CRS for measurement purposes. In step 635, the UE may decide to "camp" on this carrier. In step 640, the UE may begin the random access procedure by transmitting the random access channel (RACH) on the uplink in order to enter the RRC_CONNECTED state in step 645. There may be message exchange in step 645 between the UE and eNB. UEs have two states: RRC_CONNECTED and RRC_IDLE; the term "connected" can represent RRC_CONNECTED while "idle" can represent "RRC_IDLE.

One concept to reduce the interference from eNBs without any UEs attached (assigned, camped) is to turn those eNBs off. When UEs arrive, the eNBs would then turn on. Likewise, when there is no more traffic, the eNBs could then turn off. However, there are many modifications to the standards in order to support the on-off mechanism (on/off adaptation) such as the UE identifying the quality of an eNB based on the persistent transmission of signals such as the PSS, SSS, and CRS; when those signals are absent, how the UE can measure the quality. Other questions include regarding small cell on/off adaptation, or more generally, network adaptation:
1. Coverage issue: ensuring cellular coverage despite of small cell on/off;
2. Idle UE issue: can small cell operating on/off support UEs in the idle state? What needs to be done to support idle UEs; in the connected state, can the UE/eNB exchange data;
3. Legacy UE support (how to support UEs that do not have this feature);
4. How may fast on/off adaptation be supported? More specifically, how may fast on/off adaptation be supported, given newly introduced procedures/mechanisms (in Rel-11/12 or even beyond) such as small cell discovery and measurement enhancements; dual connectivity or more broadly, multi-stream aggregation (MSA); CoMP and enhanced CoMP (eCoMP) (including CoMP Scenario 4 (a network with low power RRHs within the macrocell coverage where the transmission/reception points created by the RRHs have the same cell IDs as the macro cell), coordination over non-ideal backhaul); massive carrier aggregation; etc.

A small cell operating on/off adaptation or power adaptation frequently (e.g., in time scale shorter than hours) may not be suitable to support idle UEs because rapid adaptation can cause idle UE to enter cell reselection frequently and consume power. Similarly, they may not be suitable for coverage support that a macro cell can provide. Such a small cell may be mainly used to support active UEs' high traffic demand in addition to the basic functionalities provided by the coverage layer. The cells on the coverage layer may not perform on/off adaptation (at least they should not do so frequently). Idle UEs may be connected to coverage layer cells only. A consequence of this is that small cells do not have to be standalone cells at least from the perspective of legacy UEs. In certain isolated local areas, however, there may exist some scenarios where coverage is not a concern and high capacity is desirable; in such cases standalone small cells operating on/off may be deployed.

Therefore, typical deployment scenarios include a coverage layer whose cells do not perform network adaptation (or at least not too frequently or significantly), and capacity layer whose cells (mainly small cells) may perform network adaptation. Coverage/mobility and idle UE support are mainly provided by the coverage layer. Typically UEs connect to cells in the coverage layer first, and then connect to small cells in the capacity layer when needed. The small cells may be co-channel or non-co-channel with those in the coverage layer. One example deployment is shown in FIG. 1B.

In an embodiment, as one efficient way to deploy and operate the small cells, a virtual cell configuration (e.g., CoMP Scenario 4) is adopted, and the small cells are configured and turned on opportunistically for UEs with high traffic demand. Thus, in such a network, coverage and idle UE support are ensured and not affected by small cell adaptation.

Disclosed herein are mechanisms that enable potential small cell on/off transition time reduction including the introduction of a discovery signal (DS) (also referred to as a discovery reference signal (DRS)) and DRS-based measurements/synchronization, and the utilization of dual connectivity. These mechanisms may be used to facilitate the following procedures: handoff (or handover, HO), Scell addition/removal and activation/deactivation in CA, SeNB addition/removal and activation/deactivation in dual connectivity, and discontinuous reception (DRX).

The on/off state transitions of cells (or network points) are generally transparent to UEs. A UE may be signaled that it should monitor a cell's CRS (i.e., the cell is activated for the UE) or should not monitor a cell's CRS (i.e., the cell is deactivated for the UE), but the signaling is UE specific or UE-group specific. The UE generally does not have sufficient information to know if the cell experiences an on/off transition. More specifically, the UE knows the cell is on if the cell is activated for the UE, but the UE cannot infer the on/off state of the cell if the cell is deactivated for the UE.

Generally, only CRS is used for RRM (radio resource management) measurements, mainly RSRP, RSRQ, and RSSI. With the introduction of DRS which may also be used for RRM measurements, a few closely-related issues regarding UE monitoring behavior with DRS configurations need to be addressed:

Whether DRS can be transmitted when cell is on

Under what condition(s) UE measurements are based on DRS, and/or CRS

Whether cell On/Off states are explicitly informed to UE

A few guidelines/preferences play roles in determining solutions to the issues: (a) UE shall be provided with necessary information to perform CRS-based RRM measurements and/or DRS-based RRM measurements without ambiguity. For example, if the UE is configured for CRS-based RRM measurements associated with a CRS, and the CRS is turned off (as the cell is turned off), then such turning off information should be signaled to the UE, otherwise the UE cannot find the CRS and cannot perform its CRS-based RRM measurements. The network should also ensure its behavior to be consistent with its signaling to UEs; (b) to avoid high signaling overhead, network assistance signaling should not be needed too frequently; (c) if a serving cell is activated as a legacy carrier for a UE, the UE can assume that the cell's CRS is transmitted as done in previous releases.

Two alternatives are discussed regarding the DRS transmissions with small cell on/off: In a first alternative, the DRS can be transmitted regardless of small cell on/off. For example, suppose that DRS can be transmitted regardless of small cell on/off. In this case, the UE with DRS configuration can perform DRS-based measurements as long as the DRS is configured, without knowing the on/off states of the cell. Therefore, if DRS is transmitted regardless of small cell on/off, no additional signaling has to be sent to UEs to explicitly inform the on/off states of the cell. The network states can be transparent to UE.

In a second alternative, the DRS is transmitted in off-state only. For example, suppose that DRS is not transmitted when a cell is on. In this case, the on-state does not allow DRS-based measurements while the off-state only allows DRS-based measurements. For a cell performing on/off, a signaling has to be transmitted to all UEs monitoring the DRS when the cell turns on. After the cell turns off, another signaling needs to be transmitted to UEs so that the UEs can resume the DRS-based measurements. The on/off states of all cells monitored by a UE, including both serving cells and neighbor cells, need to be informed to the UE. Thus, information of on/off states of neighbor cells needs to be exchanged among small cells over the backhaul connection. If frequent small cell on/off is performed, then frequent network assistance signaling and backhaul information exchange are needed.

The first alternative discussed above may be preferred for its reduced signaling overhead and simplified UE behavior. To be consistent with the first alternative, the DRS can be transmitted regardless of small cell on/off. A UE can assume that the DRS is available as long as the network configures the UE for DRS monitoring. The UE does not expect the network to transmit signaling to explicitly inform the on/off states of the cell.

Two antenna ports are said to be quasi co-located if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, and average delay. A UE should not assume that two antenna ports are quasi co-located unless specified otherwise. If the CRS-based measurements and DRS-based measurements are associated with the same cell, the network can signal to the UE the quasi-co-location (QCL) relationship between DRS ports and CRS ports of that same cell. With QCL, the UE can assume the large-scale channel characteristics with both DRS and CRS ports are the same, and hence the UE can utilize the DRS-based measurements/synchronization to facilitate CRS-based measurements/synchronization and vice versa, which speeds up small on/off transitions. In other words, the measurements based on either CRS or DRS can be assumed to be consistent with each other. As a result, with QCL, when the UE can monitor both the CRS and DRS, either CRS or DRS can be used to generate valid RRM measurements.

Generally, a UE may be signaled with QCL relationship between a DRS and a CSI-RS with respect to {delay spread, Doppler spread, Doppler shift, average gain, and average delay} or {delay spread, Doppler spread, Doppler shift, and average delay} or {Doppler spread, Doppler shift} or {average gain}, between a DRS and a CRS with respect to {delay spread, Doppler spread, Doppler shift, average gain, and average delay} or {delay spread, Doppler spread, Doppler shift, and average delay} or {Doppler spread, Doppler shift} or {average gain}, between a DRS and a DMRS (or associated EPDCCH/PDSCH) with respect to {delay spread, Doppler spread, Doppler shift, average gain, and average delay} or {delay spread, Doppler spread, Doppler shift, and average delay} or {Doppler spread, Doppler shift} or {average gain}. If all large-scale channel properties are assumed for QCLed antenna ports, then effectively channel property information derived from one type of ports can all be used for the other, for purposes such as synchronization of time/frequency, measurements (an offset may be needed depending on the transmission powers and number of antenna ports), demodulation, etc. If {delay spread, Doppler spread, Doppler shift, and average delay} are assumed for QCLed antenna ports, then the measurements may not be able to use the QCL but QCL should be applicable for all other purposes. If {Doppler spread, Doppler shift} are assumed, then only frequency synchronization may utilize the QCL. If only {average gain} are assumed, then only measurements (an offset may be needed depending on the transmission powers and number of antenna ports) may utilize the QCL.

The QCL may be signaled for antenna ports in the same component carrier. Alternatively, it may also be extended to antenna ports in different component carriers which may be noted as cross-carrier QCL. The different component carriers may be within the same frequency band or of different frequency bands. In the case that the different component carriers are within the same frequency band, the QCL can be defined with the same subset of large-scale channel qualities as in the case of the same component carrier. In the case that the different component carriers are of different frequency bands, the QCL can be defined with a reduced subset of the large-scale channel qualities from that of the same component carrier.

A connected-mode UE may also need to monitor CRS of either a serving cell or a neighbor cell. In a serving cell case, the UE can assume that the cell is on and transmitting CRS if the cell is a Pcell (which is considered as always activated) or the cell is an activated Scell (based on activation signaling). When an Scell is deactivated for a UE, the UE may not be certain if the cell is on or off, so the UE may not make any assumption on the CRS transmission, unless the UE is configured for CRS-based RRM measurement reporting for the cell. Embodiments will be provided for possible UE monitoring behaviors. This may be different from legacy UE assumptions on CRS transmissions. In the legacy case, the UE generally assumes the CRS is always transmitted from a serving cell. Even if the serving cell is deactivated for the UE, the UE can still assume CRS is transmitted.

In a neighbor cell case, the UE can assume CRS is transmitted from a neighbor cell if the network configures the UE for CRS-based measurement reporting for the cell or applicable for the cell. To be consistent with the UE assumption, the network should not configure the UE to monitor CRS of a neighbor cell performing on/off. The network may explicitly configure the UE for CRS-based measurement reporting for the cell in high-layer signaling. In addition, the network may not need to explicitly configure the UE for CRS-based measurement reporting for the cell in high-layer signaling (system information signaling or measurement object configuration); instead, the network may not block the UE from performing CRS-based measurement reporting for the cell in high-layer signaling, for example, the associated cell ID is not blacklisted or removed by the network for the UE. Then the UE may detect the CRS and perform CRS-based measurement and reporting for the cell.

The UE can assume the following regarding DRS/CRS transmissions: (a) the DRS is transmitted if the UE is configured for DRS-based RRM measurement reporting; (b) the CRS is transmitted by a serving cell if the network configures CRS-based (legacy) RRM measurement reporting for the cell; or the cell is an activated serving cell; (c) the CRS is transmitted by a neighbor cell if the network configures CRS-based (legacy) RRM measurement reporting applicable for the cell.

To be consistent with the UE assumptions, the network may be expected to follow certain behavior regarding DRS/CRS transmissions and configurations. For example, the DRS can be transmitted regardless of small cell on/off; the DRS/CRS can be transmitted if network assistance signaling configures a UE for DRS-/CRS-based RRM measurement reporting, respectively; the CRS can be transmitted if the cell is an activated serving cell for a UE, as in the legacy carrier; the network should not configure a UE for CRS-based RRM measurement reporting of a neighbor cell performing on/off.

The UE monitoring behavior should be consistent with the UE assumptions on DRS/CRS transmissions. A UE should not make any other assumptions on DRS/CRS transmissions. The purposes for a UE to monitor DRS include acquiring coarse synchronization and generating DRS-based RRM measurement reports. The purposes for a UE to monitor CRS include acquiring synchronization, generating CRS-based RRM measurement reports, and other purposes such as PDCCH decoding.

As the DRS and CRS-based measurement reporting is configured by the network, it is feasible that the network configures UE measurements in a way such that the UE does not encounter any measurement issue when some cells are performing on/off switching. Therefore, regarding the question "Under what condition(s) are UE measurements based on DRS, and/or CRS", from a UE perspective, the UE should comply with network configurations of DRS and CRS-based measurements.

With regarding to CRS monitoring behavior for a serving cell, the serving cell may be a Pcell. Generally the Pcell cannot be turned off and CRS needs to be transmitted all the time. The UE needs to monitor Pcell CRS all the time, for radio link monitoring (RLM), PDCCH demodulation, synchronization, etc. purposes. Generally the UE is configured for CRS-based measurement reporting, so the UE needs to perform RRM measurement based on CRS. If, however, CRS-based measurement reporting is not configured or removed, the UE still needs to monitor CRS but there may not be a need for the UE to generate RRM measurement based on CRS (unless DRS is not configured). If DRS-based measurement reporting is configured, the UE shall perform DRS-based measurement and reporting according to the configuration. Note the UE determines if a DRS is associated with the Pcell based on if there is a quasi-co-location (QCL) relation is signaled. If the serving cell is a special Pcell in the SeNB cell group (SCG) and RLM needs to be performed, the serving cell is treated as a normal Pcell in the CRS monitoring aspect, but the special Pcell need not perform RLM, then this serving cell is treated as an Scell in the CRS monitoring aspect.

The serving may be an Scell. As an example, suppose only CRS-based measurement reporting is configured for this cell, and no quasi-co-located DRS is configured for RRM measurement reporting, then the UE can monitor the Scell CRS all the time and generate CRS-based measurement. This is similar to legacy Scell CRS monitoring behavior. As another example, suppose only DRS-based measurement reporting is configured for this cell via quasi-co-location signaling, and CRS-based measurement reporting is either not configured or removed by the network, then the UE can monitor the Scell CRS only when the cell is activated for the UE. The UE shall not monitor the Scell CRS when the cell is deactivated for the UE.

As yet another example, suppose CRS-based measurement reporting is configured for this cell, and a quasi-co-located DRS is configured for RRM measurement reporting for this cell. Then the UE can monitor the Scell CRS and generate CRS-based measurement at least when the cell is activated for the UE. As one alternative, the cell may not be allowed to be turned off and the UE can monitor the Scell CRS and generate CRS-based measurement all the time. This is a simple solution and similar to legacy behavior; however, it lacks full flexibility for the Scell to be turned on or off. As another alternative, the cell may be turned off if it is deactivated from the UE. The UE monitors CRS only when the cell is activated for the UE, and stops monitoring CRS when the cell is deactivated for the UE. This option is slightly more complicated, but it provides the network more flexibility to turn on/off of an Scell. As yet another alternative, another network signaling may be sent to the UE for CRS monitoring behavior, such as "start CRS monitoring signaling" and "stop CRS monitoring signaling" or "CRS monitoring time window". This is even more flexible but less backward compatible, so it may be useful to be applied to new carrier type design or very fast small cell on/off. As yet another alternative, no new UE behavior is defined. The UE behaves similar to a legacy UE, always performing CRS-based measurements, but the UE may not see the CRS all the time. In this case, the generated CRS-based measurement may not be accurate, and the associated report may be ignored or further processed by the network.

The UE may be configured to perforin DRS/CRS monitoring in accordance with network assistance signaling. The UE may be configured to perform monitoring based on CRS of a cell if the cell is an activated serving cell (for synchronization, PDCCH decoding, etc.). The UE may be configured to not monitor CRS of a cell if the cell is a deactivated Scell without configured CRS-based RRM measurement reporting.

Based on the above, DRS can be transmitted regardless of small cell on/off. The UE may perform DRS and/or CRS monitoring in accordance with network assistance signaling. The UE may perform monitoring based on CRS of a cell if the cell is an activated serving cell. No signaling will be defined to explicitly inform a UE whether a cell is on or off. For example, procedures involving the on/off of Pcell, i.e., HO procedures; procedures involving the on/off of a serving cell but not a Pcell, i.e., Scell/SeNB addition/removal/ activation/deactivation; and procedures involving a neighbor cell may utilize DRS.

FIG. 3 illustrates an example of a UE monitoring Cell 2 which may be performing on/off switching. As shown in FIG. 3, in Stage 2 310, the UE is handed over into Cell 2 based on RRM measurements using Cell 2 DRS obtained in Stage 1 305, and later in Stage 4 320 the UE is handed over out of Cell 2. The UE can monitor Cell 2 DRS throughout (if the Cell 2 DRS is configured for the UE), and the UE monitors Cell 2 CRS during Stage 3 315, i.e., after the connection with Cell 2 is established and before the connection is released. The UE is configured not to monitor Cell 2 CRS when it is not served by Cell 2, via legacy measurement configuration mechanisms.

The UE does not need to be aware of the on/off transitions of Cell 2 during Stages 1 305 and 5 325. Cell 2 may perform on/off when it is not a serving cell of the UE, but Cell 2 DRS transmissions are not affected and hence the UE's measurements based on Cell 2 DRS are not affected by the on/off.

During Stage 3 315 when it is the Pcell of the UE, Cell 2 is not allowed to turn off. The UE knows that Cell 2 is on and transmitting CRS. Cell 2 also transmits DRS in Stage 3 315 and the UE can monitor both DRS and CRS.

Therefore, the HO procedure operates without any problem if a cell transmits DRS regardless of its on/off states and does not notify the UE about its on/off states.

FIG. 4 illustrates an example of a UE monitoring an Scell which may be performing on/off switching and transmit DRS. The case with an SeNB is similar. The UE is configured for DRS-based RRM measurement reporting. At Stage 1 405, an Scell is added. According to the specifications, the Scell remains deactivated until an activation signaling is received. The Scell may be deactivated later and finally removed. Once activated, the UE and Scell can follow legacy procedures and the UE monitors the Scell CRS. During the times when the Scell is not activated for the UE, the UE monitors only the Scell DRS (unless it is configured for CRS-based RRM measurement reporting for this cell).

The UE does not need to be aware of the on/off transitions of the Scell. The Scell may be turned off when it is deactivated from its UEs (unless a UE is configured for CRS-based RRM measurement reporting for this cell), but the Scell DRS transmissions are not affected and hence the UE's measurements based on the Scell DRS are not affected by the on/off. Whether to turn off the Scell is a decision to be made by the network and it does not need to be known by the UE. What the UE needs to know are network assistance signaling and whether the Scell is activated or not for the UE to determine its monitoring behavior. For procedures involving an Scell operating on/off, the on/off states can be transparent to the UE, and the UE can monitor CRS when the Scell is activated. These also hold true for the case with SeNB operation on/off.

The network can control a UE's neighbor cell CRS monitoring through legacy configuration mechanisms. If a neighbor cell may perform on/off switching, the network may prevent the UE from monitoring the cell's CRS at least when the cell is turned off, by suitable measurement object configurations. However, to enable RRM measurements of a neighbor cell performing on/off, the network can configure a DRS-based measurement for the UE to monitor the cell's DRS. The DRS is always transmitted, and the UE can always monitor the DRS as long as it is configured, regardless of whether the cell is on or off.

Note that for the network to configure a UE to perform CRS-based RRM measurement reporting for a cell, the network may explicitly specify the cell ID to the UE in the measurement signaling. Another possibility is that the network does not explicitly specify the cell ID to the UE in the measurement signaling, but the network does not blacklist the cell ID in the measurement object signaling, so the UE may detect the cell and perform CRS-based RRM measurement reporting for the cell. In this case, the network also has the flexibility to remove the cell from being measured by the UE through explicit signaling (e.g., neighbor cell list signaling). Therefore, a UE may also perform CRS-based RRM measurement and reporting for a cell if the cell is not blacklisted and if the cell is not deleted by the network for measurement reporting.

The DRS reporting triggering conditions and reporting configurations may have several embodiments. For example, in one embodiment, the CRS-based measurement reporting triggering conditions and reporting configurations are reused for DRS, with network signaled additional offsets. For example, the network may configure an x dB offset to be applied to a DRS-based measurement when the measurement value is used in triggering conditions. Such an x dB offset may or may not need to be applied to the reported DRS-based measurement values, since the network can apply the x dB offset if needed. The x dB offset may be decided by the network based on the numbers of antenna ports of DRS/CRS, the transmission power levels of DRS/CRS, and additional selection bias chosen by the network. For example, if DRS has 2 ports and CRS has 1 port, and DRS has its transmission power 1 dB higher than the CRS, then x=4+y dB where the differences in antenna ports and transmission power levels contribute to 4 dB offset, and y is an additional bias. In another embodiment, the network configures only the additional bias (e.g., the y dB as in the example), and the UE calculates the offset due to the differences in antenna ports and transmission power levels based on network signaled DRS configurations. In another embodiment, aperiodic DRS reporting trigger is sent from the network to the UE, similar to aperiodic CSI reporting, and the UE reports the associated DRS-based measurements in the assigned resources. The trigger may be carried in (E)PDCCH as in the aperiodic CSI reporting case, and similar DCI format may be reused, with extra indication of this trigger is for DRS-based RRM measurement instead of CSI measurement. This embodiment provides more flexibility to the network to obtain any DRS-based measurements anytime needed. The above embodiment may be combined.

Utilizing DRS, faster small cell on/off may be achieved for an activated Scell. Generally, faster small cell on/off leads to better network throughput performance. To support such fast on/off, e.g., dynamically on a per subframe level, new physical layer procedures (Layer 1 procedures or L1 procedures) may be used. Several preconditions for the new L1 procedure are needed, such as CSI availability, timing advance (TA) assumptions, UE monitoring behavior, etc.

A UE can monitor the CRS of an activated Scell every downlink subframe. However, to enable an activated Scell to perform on/off during the activation duration, the monitoring behavior must be changed. In general, three types of RSs may be transmitted by an activated Scell performing on/off: DRS, CSI-RS, and CRS.

With regard to DRS, the UE is required to monitor DRS for every DRS burst according to its DRS configuration. The DRS bursts may be transmitted/monitored with an increased density in time domain for an activated Scell, thus the DRS bursts may be used for CSI measurements during the activation duration; for example, CRS/CSI-RS may also be transmitted in DRS bursts. Alternatively, the DRS burst period remains the same regardless of activation/deactivation status of the Scell, but then the CSI measurement will need to be done by using other RS.

With regard to CSI-RS, it is reasonable to assume an activated Scell transmits CSI-RS for its better capability to support MIMO, CoMP, interference measurements, etc., with lower overhead. The UE may be signaled with a QCL signaling which indicates a QCL relation between CSI-RS and CRS. Generally, CSI-RS has higher density in time domain than DRS, making it more suitable for CSI measurements. Thus, it is proposed to rely on CSI-RS for CSI measurements. Because CSI-RS for CSI measurements is mainly useful for an activated Scell, it is not necessary for a UE to monitor the CSI-RS which is QCLed with the Scell CRS when the Scell is deactivated.

With regard to CRS, with the introduction of CSI-RS/DMRS/DMRS and EPDCCH, it does not seem necessary to transmit CRS regularly by an activated Scell performing on/off. Thus, it seems reasonable to further study the CoMP Scenario 4 type of operation (e.g., same cell ID operations) for fast on/off. In this case, QCL relation between DRS and CSI-RS/DMRS may be specified.

If CRS needs to be monitored, then it should be restricted to DRS bursts, CSI-RS subframes, and data-carrying subframes, so that the Scell may be turned off in all other subframes. The data-carrying subframes may be indicated to a UE by another cell or a new signaling (e.g. cross-carrier, cross-point, or cross-subframe scheduling, to be discussed). Therefore, in an exemplary embodiment, the UE may monitor only DRS burst, CSI-RS subframes, and data-carrying subframes for an activated Scell.

To enable fast on/off without the need for the UE to monitor DL scheduling signaling every subframe, the scheduling signaling needs to be enhanced. Cross-carrier, cross-point, and/or cross-subframe signaling may be used. For example, the signaling may be carried in another cell's (E)PDCCH, such as Pcell's PDCCH, which the UE should always monitor; another point's EPDCCH, which the UE is configured to monitor; the Scell's (E)PDCCH during a DRS burst, CSI-RS subframe, and data-carrying subframe.

Note that the above-mentioned (E)PDCCH may or may not need to signal the UE resource allocation information about the PDSCH; instead, it may signal the UE to start monitoring the Scell's (E)PDCCH to find the PDSCH. For example, suppose the UE is not expected to monitor an activated Scell for the next several subframes as there is not DRS/CSI-RS expected. To quickly enable the Scell PDSCH transmission to the UE, the Pcell may send a one-bit indicator in Pcell's PDCCH at subframe n, telling the UE to monitor Scell (E)PDCCH at subframe n+1. Thus the PDSCH transmission can be enabled at subframe n+1. In this case, the signaling may be called as "start-monitoring signaling". Similarly, a signaling to inform the UE to stop monitoring may be introduced. On/off duration granularity may also be used to signal a UE the minimum/maximum durations of monitoring time and non-monitoring time.

Figure 5:
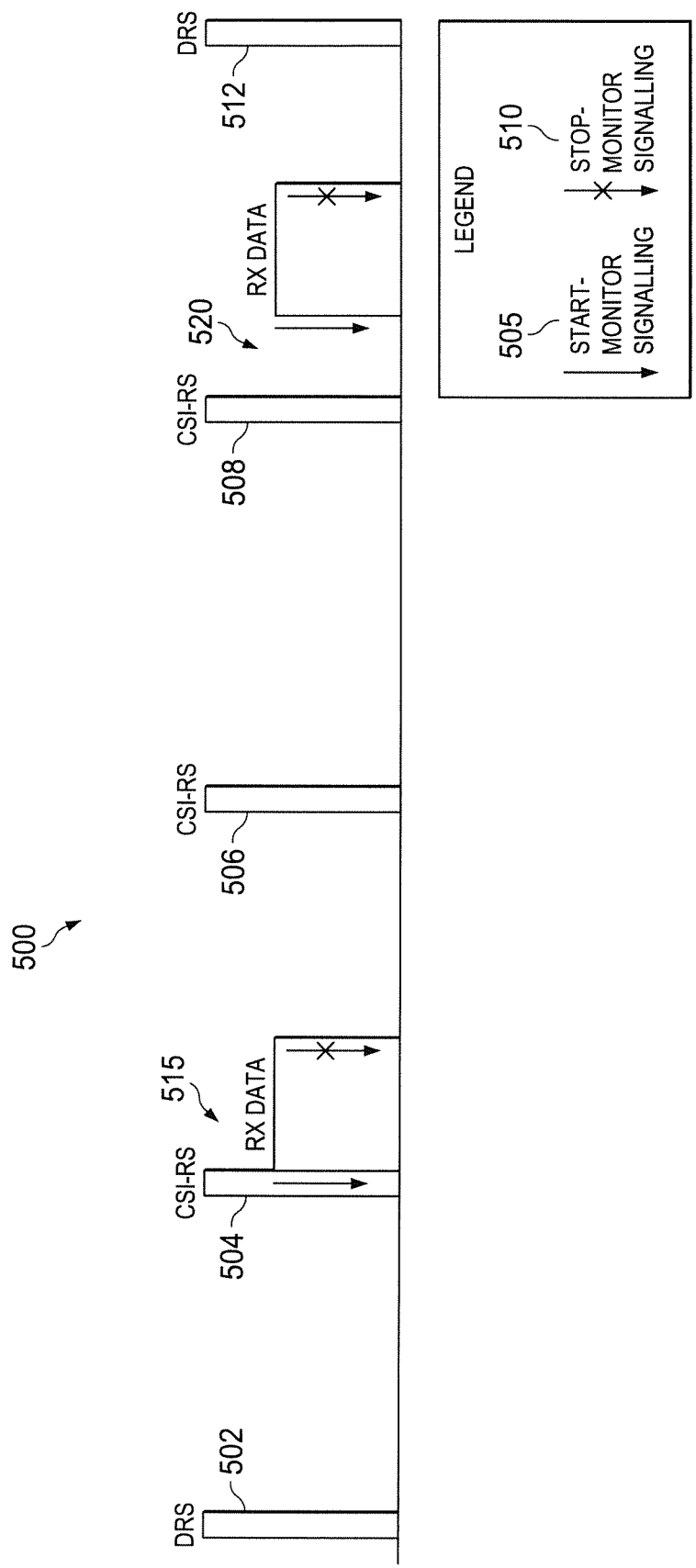
FIG. 5 illustrates an example embodiment of an L1 procedure for fast on/off of an activated Scell.

An embodiment of an L1 procedure 500 is illustrated in an example in FIG. 5. The UE does not monitor the activated Scell except for subframes containing DRS/CSI-RS, such as a first DRS subframe 502, a first CSI-RS subframe 504, a second CSI-RS subframe 506, a third CSI-RS subframe 508, and a second DRS subframe 512, unless it receives a "start-monitor signaling" 505. The signaling may be sent from the Scell in a subframe containing DRS/CSI-RS (as shown as the first such signaling 515 in the first CSI-RS subframe 504), or from another cell/point RS (as shown as the second such signaling 520). After the UE receives the signaling, it starts monitoring for (E)PDCCH and may receive data for a number of subframes. Finally, the UE stops monitoring the Scell after it receives a "stop-monitor signaling" 510.

Another embodiment for fast on/off does not rely on addition signaling such as "start-monitoring signaling" and "stop-monitor signaling". The regular transmission of CRS may not be needed for the Scell. Typically, CRS is used for a variety of purposes: RRM measurements, CSI measurement and feedback, demodulation of PDCCH and PDSCH without DMRS, time/frequency synchronization, RLM, and so on. However, with proper network configurations, the functionalities of CRS can be replaced by other signals. Hence, no CRS transmission may be feasible even if the S cell is activated for a UE, and the cell may be turned on opportunistically at any time to serve a UE and turned off at any time, except for DRS/CSI-RS may still be transmitted regularly.

For RRM measurements: DRS can be used instead. A UE is not configured for CRS-based RRM measurement reporting for the Scell, and the UE is configured for DRS-based RRM measurement reporting for the Scell. The DRS needs to be associated with the Scell by linking the DRS VCID with the Scell PCID, or the DRS may be associated with the Scell's CRS (though the CRS may not be regularly transmitted), or the UE does not need to receive any signaling that the DRS is associated with the Scell or its CRS, either directly or indirectly (e.g., via QCL relations with other RSs).

For CSI measurement and feedback: CSI-RS can be used instead. The UE is configured with CSI processes based on CSI-RS only (and possibly CSI-IM resources for interference measurements). The QCL between the CSI-RS and DRS may need to be signaled.

For demodulation of control channel: either EPDCCH with a DMRS from the Scell or (E)PDCCH from another cell can be used. The DMRS needs to be associated with the DRS and/or CSI-RS via QCL. DMRS enhancements may also be introduced for better demodulation performance.

For demodulation of PDSCH: PDSCH with a DMRS from the Scell can be used. The DMRS needs to be associated with the DRS and/or CSI-RS via QCL. DMRS enhancements may also be introduced for better demodulation performance.

Time/frequency synchronization: DRS and/or CSI-RS can be used. DRS may provide coarse synchronization, and CSI-RS may provide fine synchronization.

UE monitoring behavior: the UE may be signaled for a transmission mode without assuming any CRS presence or without assuming CRS in some subframes. As an alternative, the UE only assumes CRS transmission in the subframe where the UE was scheduled for PDSCH transmission. The CRS REs may be used to transmit other signals where the UE may be informed that the CRS RE can be utilized for PDSCH transmissions. Alternatively, the UE may not be notified about the presence of CRS, but UE's normal operations are not affected by the lack of CRS. The UE may even be configured with CRS-based measurement reporting, but the report may be ignored or further processed by the network, or the UE may not update its CRS-based measurement in any subframe when CRS is not detected by the UE.

The network may configure no CRS or DRS transmission for a specific component carrier. Instead, for UEs to receive transmissions in this component carrier, the CSI-RS and DMRS in this component carrier may be signaled as QCLed with DRS in another component carrier in the same frequency band.

Regarding DRS, one embodiment is to let the small cells within a small cell cluster to transmit DRS on the same set of time/frequency resources with the same scrambling sequence, but each small cell is assigned with a unique cyclic shift. In other words, there is a one-to-one correspondence between the small cells and the cyclic shifts. Then a UE can perform measurements of each cell by measuring the energy associated with each cyclic shift.

In LTE systems, generally the cells close to each other do not use the same RS configurations. The RSs of these cells are separated in time, frequency, space, and/or sequence, in order to avoid strong inter-cell interference among the RSs. However, in uplink, different UEs close to each other may share some RS resources in time, frequency, space, and sequence. Separation of these RS is done by recognizing the fact that the channel impulse response (and hence PDP) is of finite duration. Thus RS of different transmitters can be transmitted in the same OFDM symbol and same sets of subcarriers with different cyclic shift values and separable channel PDP estimates are obtained at the receiver. Since a cyclic time shift is equivalent to a phase ramp in the frequency domain, each transmitter can apply the corresponding cyclic shift by phase ramp upon the subcarrier in the frequency domain. As an illustrative example of channel PDP estimates in time domain corresponding to processing results of the received RS from different transmitters, there may be four RS transmitted from four transmitters by applying different cyclic shifts upon the same pseudorandom sequence. The PDP estimates may not be overlapped in the time domain in the figure because each channel PDP estimate is assigned with different cyclic offset in the time domain.

However, it has been viewed as undesirable or very challenging if such RS separation used in uplink is to be extended to downlink RS transmissions. The reasons may include the following factors. First, the downlink transmissions in baseline LTE (e.g., LTE Rel-8) may not be synchronized. Therefore, the PDP estimates from different cells may be based on different time references and hence they cannot be identified and separated at the receiver (i.e., UE) with sufficient accuracy. On the contrary, the uplink transmissions are synchronized for a receiver (i.e., a cell). Second, a macro cell usually covers a wide area, and therefore the propagation delay differences from different macro cells seen by a UE may cause PDP estimates shift in time, which makes the PDP estimates difficult to be identified and separated with sufficient accuracy. Third, LTE RS in an OFDM symbol is distributed in time domain in a fashion such as one RS RE in every six REs. This makes the PDP estimation time range quite small and hence it is generally not suitable to use cyclic shifts to distinguish cells.

In an embodiment, the network configures the DRS such that one or more cyclic shifts are not associated with any small cells in a cluster. In other words, all cells in the cluster may mute on the cyclic shift. However, the UE is still configured to report the measurement result associated with the cyclic shift. Since no small cell in the cluster transmits any signal associated with the cyclic shift, the UE measurement associated with the cyclic shift is in fact the measurement of interference from cells outside the cluster. Therefore, this embodiment may be used for inter-cluster interference measurement and reporting. The UE should assume that, if a cyclic shift is not configured to be associated with a cell and a measurement reporting is configured for the cyclic shift, then interference measurement is to be performed and reported associated with the cyclic shift.

In an embodiment, the network configures an interference measurement cyclic shift for a UE. In other words, the network may specify if a cyclic shift is used for signal measurement or interference measurement (or neither).

In an embodiment, the interference measurement result is not configured for reporting, but is configured for the UE to generate an SINR report or an RSRQ report. The network may configure a measurement process with a signal-measurement cyclic shift ID and an interference-measurement cyclic shift ID.

In an embodiment, one or more small cells in a cluster may not mute on a cyclic shift, and the cyclic shift is configured for a UE to perform signal and/or interference and/or RSSI measurements. In other words, the network may not need to signal the correspondence relationship between a cyclic shift and a small cell. Instead, the network configures a measurement process with a signal-measurement cyclic shift ID and an interference-/RSSI-measurement cyclic shift ID. More than one such process may be configured for a UE, and each process can have its own reporting configuration. Depending on network configuration and implementation, this can be used to generate an SNR report, an SINR report, an RSRP report, an RSRQ report, etc. For example, if a measurement process has a signal-measurement cyclic shift associated with cell m, and the interference-/RSSI-measurement cyclic shift is associated with all cells transmitting (no muting), then the RSRQ associated with cell m can be obtained. If the signal-measurement cyclic shift associated with cells m and n, then effectively the measurement can be used for CoMP transmission. If the interference-/RSSI-measurement cyclic shift is associated with a subset of small cells in the cluster, then the measurement can be used if the other cells in the cluster are turned off.

In an embodiment, a UE should rate match on the DRS resources associated with its serving cell. Alternatively, a zero-power CSI-RS configuration may be sent for the rate matching purpose, for the serving cell or cells outside the cluster of its serving cell. In an embodiment, the DRS resources always occupy the $9^{th}$ and $10^{th}$ OFDM symbol in a subframe. Then the rate matching signaling can be simplified, i.e., the network does not need to configure a 16-bit bitmap for rate matching on DRS resources, instead, the network configures one-bit for rate matching on DRS resources.

Figure 7:
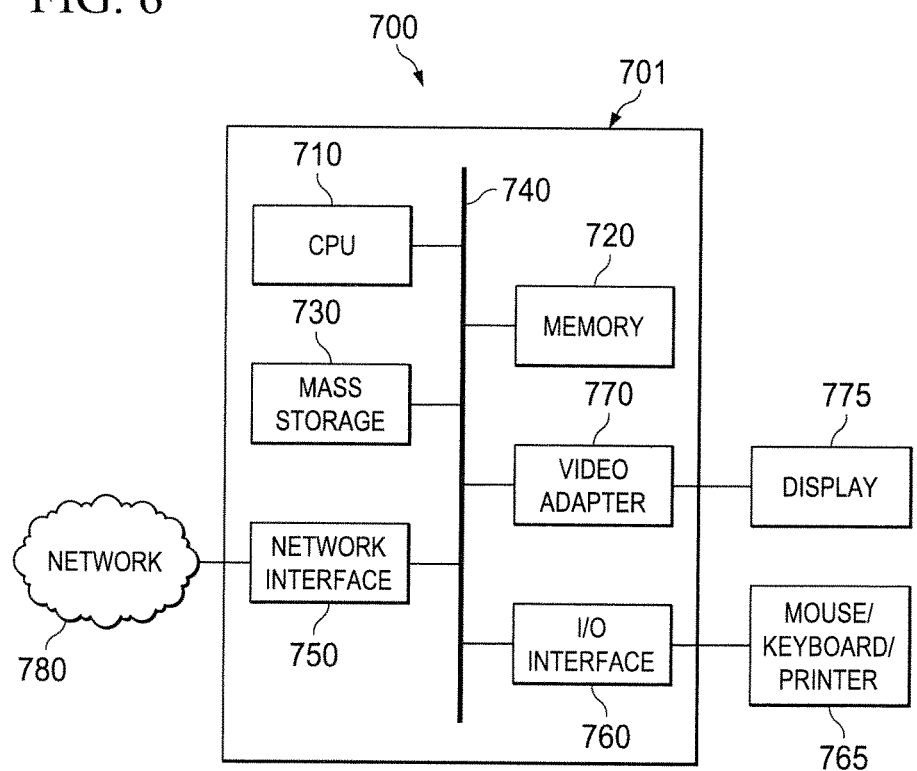
FIG. 7 illustrates an example computing platform that may be used for implementing, for example, the devices and methods described herein, in accordance with an embodiment.

FIG. 7 is a block diagram of a processing system 700 that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system 700 may comprise a processing unit 701 equipped with one or more input/output devices, such as a speaker, microphone, mouse, touchscreen, keypad, keyboard, printer, display, and the like. The processing unit 701 may include a central processing unit (CPU) 710, memory 720, a mass storage device 730, a video adapter 770, and an I/O interface 760 connected to a bus 740.

The bus 740 may be one or more of any type of several bus architectures including a memory bus or memory controller, a peripheral bus, video bus, or the like. The CPU 710 may comprise any type of electronic data processor. The memory 720 may comprise any type of system memory such as static random access memory (SRAM), dynamic random access memory (DRAM), synchronous DRAM (SDRAM), read-only memory (ROM), a combination thereof, or the like. In an embodiment, the memory 720 may include ROM for use at boot-up, and DRAM for program and data storage for use while executing programs.

The mass storage device 730 may comprise any type of storage device configured to store data, programs, and other information and to make the data, programs, and other information accessible via the bus 740. The mass storage device 730 may comprise, for example, one or more of a solid state drive, hard disk drive, a magnetic disk drive, an optical disk drive, or the like.

The video adapter 770 and the I/O interface 760 provide interfaces to couple external input and output devices to the processing unit. As illustrated, examples of input and output devices include a display 775 coupled to the video adapter 770 and a mouse/keyboard/printer 765 coupled to the I/O interface 760. Other devices may be coupled to the processing unit 701, and additional or fewer interface cards may be utilized. For example, a serial interface such as Universal Serial Bus (USB) (not shown) may be used to provide an interface for a printer.

The processing unit 701 also includes one or more network interfaces 750, which may comprise wired links, such as an Ethernet cable or the like, and/or wireless links to access nodes or different networks. The network interface 750 allows the processing unit 701 to communicate with remote units via a network 780. For example, the network interface 750 may provide wireless communication via one or more transmitters/transmit antennas and one or more receivers/receive antennas. In an embodiment, the processing unit 701 is coupled to a local-area network or a wide-area network for data processing and communications with remote devices, such as other processing units, the Internet, remote storage facilities, or the like.

According to one embodiment, there is provided a method in a network controller for communicating with user equipment (UE) and a network component. The method includes transmitting, by the network controller, an activation signaling to user equipment (UE) that indicates a carrier associated with a network component is activated, where the carrier is configured to the UE but not activated to the UE. The method includes transmitting, by the network controller, a first monitoring signaling to the UE, the first monitoring signaling indicating to the UE to monitor downlink signals on the carrier associated with the network component, where the first monitoring signaling indicates to the UE to monitor downlink transmissions that includes one or more of a discovery reference signal (DRS), a channel status indicator reference signal (CSI-RS), a common reference signal (CRS), a downlink control channel, and a demodulation reference signal (DMRS), wherein the downlink control channel comprises one or more of a physical downlink control channel (PDCCH) and an enhanced PDCCH ((E)PDCCH).

In another embodiment, there is provided a method in a user equipment (UE) for communicating in a wireless network. The method includes receiving, at the UE, an activation signaling from a network controller, the activation signaling indicating a carrier associated with a network component is activated, where the carrier is configured to the UE but not activated to the UE, and receiving, at the UE, a first monitoring signaling from the network controller, the first monitoring signaling indicating to the UE to monitor downlink signals on the carrier associated with the network component. The first monitoring signaling indicates to the UE to monitor downlink data that includes one or more of a discovery reference signal (DRS), a channel status indicator reference signal (CSI-RS), a common reference signal (CRS), a downlink control channel, and a demodulation reference signal (DMRS), wherein the downlink control channel comprises one or more of a physical downlink control channel (PDCCH) and an enhanced PDCCH ((E)PDCCH).

In another embodiment, there is provided a network controller in a wireless network for communicating with user equipment (UE) and a network component. The network controller comprises a transmitter configured to send activation signaling to the UE, the activation signaling indicating a carrier associated with the network component is activated, wherein the carrier is configured to the UE but not activated to the UE, and send first monitoring signaling to the UE, the first monitoring signaling indicating to the UE to monitor downlink signals on the carrier associated with the network component. The first monitoring signaling indicates to the UE to monitor downlink data that includes one or more of a discovery reference signal (DRS), a channel status indicator reference signal (CSI-RS), a common reference signal (CRS), a downlink control channel, and a demodulation reference signal (DMRS), wherein the downlink control channel comprises one or more of a physical downlink control channel (PDCCH) and an enhanced PDCCH ((E)PDCCH).

In yet another embodiment, there is provided a user equipment (UE) for communicating in a wireless network. The UE comprises a receiver configured to receive activation signaling from a network controller, the activation signaling indicating a carrier associated with a network component is activated, wherein the carrier is configured to the UE but not activated to the UE, and receive first monitoring signaling from the network controller, the first monitoring signaling indicating to the UE to monitor downlink signals on the carrier associated with the network component. The UE comprises a processor and memory coupled to the receiver, where the processor and memory are configured, in accordance with the first monitoring signaling, to indicate to the UE to monitor downlink data that includes one or more of a discovery reference signal (DRS), a channel status indicator reference signal (CSI-RS), a common reference signal (CRS), a downlink control channel, and a demodulation reference signal (DMRS), wherein the downlink control channel comprises one or more of a physical downlink control channel (PDCCH) and an enhanced PDCCH ((E)PDCCH).

In some embodiments, some or all of the functions or processes of the one or more of the devices are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like.

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A method in a network controller for controlling a secondary cell (Scell), the method comprising:
transmitting, by the network controller, a corresponding measurement reporting signaling to each of one or more user equipments (UEs) in a set of UEs, the corresponding measurement reporting signaling indicating a radio resource management (RRM) measurement reporting configuration of each of the one or more UEs; and
transmitting, by the network controller, a control signal to the Scell, the control signal controlling the Scell, while the Scell is deactivated for each UE in the set of UEs, to transmit a discovery reference signal (DRS) without transmitting a common reference signal (CRS) until the Scell has been activated for at least one UE in the set of UEs, the Scell being in an ON-state when the Scell is activated for at least one UE in the set of UEs and in the ON-state at least a portion of a time when the Scell is deactivated for at least one UE in the set of UEs.

2. The method in accordance with claim 1, further comprising transmitting, by the network controller, a corresponding deactivation signaling to each of the one or more UEs in the set of UEs, the corresponding deactivation signaling indicating that the Scell is deactivated for each of the one or more UEs in the set of UEs and indicating to each of the one or more UEs in the set of UEs to monitor only the DRS.

3. The method in accordance with claim 1, wherein the Scell is deactivated for at least one UE in the set of UEs in response to expiration of a timer in the UE.

4. The method in accordance with claim 1, wherein the Scell is deactivated for at least one UE in the set of UEs after a handover.

5. The method in accordance with claim 1, further comprising:
transmitting, by the network controller, a corresponding activation signaling to each of the one or more UEs in the set of UEs, the corresponding activation signaling indicating that the Scell is activated for each of the one or more UEs in the set of UEs and indicating to each of the one or more UEs in the set of UEs to monitor other signals of the Scell; and
controlling the Scell to transmit a common reference signal (CRS) to each of the one or more UEs in the set of UEs in accordance with the activation signaling.

6. The method in accordance with claim 1, wherein the network controller and the Scell are not co-located and controlling the Scell comprises sending a control signaling to the Scell.

7. The method in accordance with claim 1, wherein the Scell is a neighbor cell.

8. A network controller in a wireless network for controlling a secondary cell (Scell), comprising:
a transmitter configured to transmit a corresponding measurement reporting signaling to each of one or more user equipments (UEs) in a set of UEs, the corresponding measurement reporting signaling indicating a radio resource management (RRM) measurement reporting configuration of each of the one or more UEs; and
a processor and memory coupled to the transmitter, wherein the processor and memory are configured to control the Scell, while the Scell is deactivated for each UE in the set of UEs, to transmit a discovery reference signal (DRS) without transmitting a common reference signal (CRS) until the Scell has been activated for at least one UE in the set of UEs, the Scell being in an ON-state when the Scell is activated for at least one UE in the set of UEs and in the ON-state at least a portion of a time when the Scell is deactivated for at least one UE in the set of UEs.

9. The network controller in accordance with claim 8, wherein the transmitter is further configured to transmit a corresponding deactivation signaling to each of the one or more UEs in the set of UEs, the corresponding deactivation signaling indicating that the Scell is deactivated for each of the one or more UEs in the set of UEs and indicating to each of the one or more UEs in the set of UEs to monitor only the DRS.

10. The network controller in accordance with claim 8, wherein the Scell is deactivated for at least one UE in the set of UEs in response to expiration of a timer in the UE.

11. The network controller in accordance with claim 8, wherein the Scell is deactivated for at least one UE in the set of UEs after a handover.

12. The network controller in accordance with claim 8, wherein the transmitter is further configured to transmit a corresponding activation signaling to each of the one or more UEs in the set of UEs, the corresponding activation signaling indicating that the Scell is activated for each of the one or more UEs in the set of UEs and indicating to each of the one or more UEs in the set of UEs to monitor other signals of the Scell; and
wherein the processor and memory are configured to control the Scell to transmit a common reference signal (CRS) to each of the one or more UEs in the set of UEs in accordance with the activation signaling.

13. The network controller in accordance with claim 8, wherein the network controller and the Scell are not co-located, wherein the processor and memory are configured to control the Scell by generating a control signaling, and wherein the transmitter is configured to send the control signaling to the Scell.

14. The network controller in accordance with claim 8, wherein the Scell is a neighbor cell.

15. A method in a user equipment (UE) for communicating in a wireless network, the method comprising:
receiving, by the UE, a measurement reporting signaling from a network controller, the measurement reporting signaling indicating a radio resource management (RRM) measurement reporting configuration of the UE; and
monitoring, by the UE, one or more downlink channels for a discovery reference signal (DRS) from a secondary cell (Scell) that is deactivated for the UE without monitoring the one or more downlink channels for at least a common reference signal (CRS) from the Scell until the Scell is activated for the UE, the Scell being in an ON-state when the Scell is activated for the UE and in an ON-state at least a portion of a time when the Scell is deactivated for the UE.

16. The method in accordance with claim 15, further comprising receiving, by the UE, a deactivation signaling from the network controller, the deactivation signaling indicating that the Scell is deactivated for the UE and indicating to the UE to monitor only the DRS.

17. The method in accordance with claim 15, wherein the Scell is deactivated for the UE in response to expiration of a timer in the UE.

18. The method in accordance with claim 15, wherein the Scell is deactivated for the UE after a handover.

19. The method in accordance with claim 15, further comprising:
  receiving, by the UE, an activation signaling from the network controller, the activation signaling indicating that the Scell is activated for the UE and indicating to the UE to monitor other signals of the Scell; and
  receiving, by the UE, a common reference signal (CRS) from the Scell in accordance with the activation signaling.

20. The method in accordance with claim 15, wherein the Scell is a neighbor cell.

21. A user equipment (UE) for communicating in a wireless network, comprising:
  a receiver configured to:
    receive a measurement reporting signaling from a network controller, the measurement reporting signaling indicating a radio resource management (RRM) measurement reporting configuration of the UE; and
    monitor one or more downlink channels for a discovery reference signal (DRS) from a secondary cell (Scell) that is deactivated for the UE without monitoring the one or more downlink channels for at least a common reference signal (CRS) from the Scell until the Scell is activated for the UE, the Scell being in an ON-state when the Scell is activated for the UE and in an ON-state at least a portion of a time when the Scell is deactivated for the UE.

22. The user equipment in accordance with claim 21, wherein the receiver is further configured to receive a deactivation signaling from the network controller, the deactivation signaling indicating that the Scell is deactivated for the UE and indicating to the UE to monitor only the DRS.

23. The user equipment in accordance with claim 21, further comprising a timer, wherein the Scell is deactivated for the UE in response to expiration of the timer.

24. The user equipment in accordance with claim 21, wherein the Scell is deactivated for the UE after a handover.

25. The user equipment in accordance with claim 21, wherein the receiver is further configured to:
  receive an activation signaling from the network controller, the activation signaling indicating that the Scell is activated for the UE and indicating to the UE to monitor other signals of the Scell; and
  receive a common reference signal (CRS) from the Scell in accordance with the activation signaling.

26. The user equipment in accordance with claim 21, wherein the Scell is a neighbor cell.

* * * * *